(12) United States Patent
Maranan et al.

(10) Patent No.: US 8,906,280 B2
(45) Date of Patent: *Dec. 9, 2014

(54) METHOD OF MANUFACTURING SOLE ASSEMBLY FOR ARTICLE OF FOOTWEAR

(75) Inventors: Estelle A. Maranan, Beaverton, OR (US); Michael Hochdoerffer, Portland, OR (US); Jason C. Mayden, Beaverton, OR (US); Jun Peng, GuangZhou (CN)

(73) Assignee: NIKE, Inc., Beaverton, OR (US)

( * ) Notice: Subject to any disclaimer, the term of this patent is extended or adjusted under 35 U.S.C. 154(b) by 322 days.

This patent is subject to a terminal disclaimer.

(21) Appl. No.: 13/590,447

(22) Filed: Aug. 21, 2012

(65) Prior Publication Data

US 2013/0049257 A1    Feb. 28, 2013

Related U.S. Application Data

(63) Continuation of application No. 12/552,778, filed on Sep. 2, 2009, now Pat. No. 8,246,881.

(51) Int. Cl.
*B29C 45/14* (2006.01)
*B29C 45/16* (2006.01)

(52) U.S. Cl.
USPC ........ 264/250; 264/275; 264/347; 264/297.2; 264/248; 264/238

(58) Field of Classification Search
None
See application file for complete search history.

(56) References Cited

U.S. PATENT DOCUMENTS

| | | | |
|---|---|---|---|
| 2,410,019 A | 10/1946 | Davis | |
| 2,930,149 A | 3/1960 | Hack et al. | |
| 2,981,011 A | 4/1961 | Lombardo | |
| 3,129,520 A | 4/1964 | Funck | |
| 3,608,004 A | 9/1971 | Borisuck et al. | |
| 4,302,892 A | 12/1981 | Adamik | |
| 4,364,188 A | 12/1982 | Turner et al. | |
| 4,364,189 A | 12/1982 | Bates | |

(Continued)

FOREIGN PATENT DOCUMENTS

| | | |
|---|---|---|
| CN | 1067610 A | 1/1993 |
| CN | 101052513 A | 10/2007 |

(Continued)

OTHER PUBLICATIONS

Office Action, issued Sep. 27, 2013, in corresponding Chinese Application No. 201080038975.3, including list of references.

(Continued)

*Primary Examiner* — Edmund H. Lee (74) *Attorney, Agent, or Firm* — Banner & Witcoff, Ltd.

(57) ABSTRACT

A method of forming a midsole includes the steps of placing a first mold member and a second mold member in contact with one another, injecting a first material into the first mold member to form first and second portions of a midsole preform, positioning the first and second portions in a third mold member of a second mold assembly; placing a second material in the third mold member; placing the third mold member and a fourth mold member in contact with one another, subjecting the second material and the first and second portions to heat to form a midsole preform, placing the midsole preform in a fifth mold member, placing the fifth mold member and a sixth mold member in contact with one another; and subjecting the midsole preform to heat and pressure to form a midsole.

14 Claims, 6 Drawing Sheets

(56) References Cited

U.S. PATENT DOCUMENTS

| | | |
|---|---|---|
| 4,398,357 A | 8/1983 | Batra |
| 4,506,462 A | 3/1985 | Cavanagh |
| 4,547,979 A | 10/1985 | Harada et al. |
| 4,551,930 A | 11/1985 | Graham et al. |
| 4,557,060 A | 12/1985 | Kawashima |
| 4,581,187 A | 4/1986 | Sullivan et al. |
| 4,624,061 A | 11/1986 | Wezel et al. |
| 4,642,911 A | 2/1987 | Talarico, II |
| 4,654,983 A | 4/1987 | Graham et al. |
| 4,667,423 A | 5/1987 | Autry et al. |
| 4,674,204 A | 6/1987 | Sullivan et al. |
| 4,730,402 A | 3/1988 | Norton et al. |
| 4,759,136 A | 7/1988 | Stewart et al. |
| 4,766,679 A | 8/1988 | Bender |
| 4,876,053 A | 10/1989 | Norton et al. |
| 4,956,927 A | 9/1990 | Misevich et al. |
| 5,025,573 A | 6/1991 | Giese et al. |
| 5,053,179 A | 10/1991 | Masui et al. |
| 5,141,578 A | 8/1992 | Yang |
| 5,147,589 A | 9/1992 | Chang et al. |
| 5,177,824 A | 1/1993 | Ou |
| 5,308,420 A | 5/1994 | Yang |
| 5,318,645 A | 6/1994 | Yang |
| 5,325,611 A | 7/1994 | Dyer et al. |
| 5,362,435 A | 11/1994 | Volpe |
| 5,396,675 A | 3/1995 | Vincent et al. |
| 5,435,077 A | 7/1995 | Pyle |
| 5,435,078 A | 7/1995 | Pyle |
| 5,560,877 A * | 10/1996 | Yung et al. ........................ 264/51 |
| 5,572,805 A | 11/1996 | Giese et al. |
| 5,575,089 A | 11/1996 | Giese et al. |
| 5,649,374 A | 7/1997 | Chou |
| 5,725,823 A | 3/1998 | Finn et al. |
| 5,787,610 A | 8/1998 | Brooks |
| RE35,905 E | 9/1998 | Vincent et al. |
| 5,843,352 A * | 12/1998 | Chi ................................. 264/45.1 |
| 5,921,004 A | 7/1999 | Lyden |
| 6,023,859 A | 2/2000 | Burke et al. |
| 6,045,733 A * | 4/2000 | Chu et al. ....................... 264/46.6 |
| 6,061,929 A | 5/2000 | Rittler |
| D426,053 S | 6/2000 | Santa |
| 6,689,300 B2 | 2/2004 | Chang |
| 6,748,675 B2 | 6/2004 | Sato |
| 6,749,781 B1 | 6/2004 | Maurer |
| 6,944,975 B2 * | 9/2005 | Safdeye et al. ................ 36/59 R |
| 7,056,459 B2 | 6/2006 | Park |
| 7,179,414 B2 * | 2/2007 | Safdeye et al. ................ 264/244 |
| 7,281,343 B2 | 10/2007 | Riha et al. |
| 7,313,875 B2 | 1/2008 | Morgan |
| 7,464,428 B2 | 12/2008 | Norton |
| 2003/0115776 A1 | 6/2003 | Chu |
| 2003/0208930 A1 | 11/2003 | Swigart |
| 2004/0056377 A1 | 3/2004 | Hsu et al. |
| 2004/0154188 A1 | 8/2004 | Laska |
| 2005/0175726 A1 | 8/2005 | Yang |
| 2008/0060228 A1 | 3/2008 | Morgan et al. |

FOREIGN PATENT DOCUMENTS

| | | |
|---|---|---|
| DE | 202004016192 U1 | 1/2005 |
| EP | 1281506 A1 | 2/2003 |
| EP | 1352579 A1 | 10/2003 |
| EP | 1468815 A1 | 10/2004 |
| EP | 1632337 A2 | 3/2006 |

OTHER PUBLICATIONS

English translation of Office Action, issued Sep. 27, 2013, in corresponding Chinese Application No. 201080038975.3.

International Search Report and Written Opinion, issued Dec. 6, 2010, in corresponding PCT Application No. PCT/US2010/047224.

* cited by examiner

METHOD OF MANUFACTURING SOLE ASSEMBLY FOR ARTICLE OF FOOTWEAR

RELATED APPLICATIONS

This application is a continuation of application Ser. No. 12/552,778, filed on Sep. 2, 2009, which is entirely incorporated herein by reference.

FIELD OF THE INVENTION

Aspects of this invention relate generally to a mold assembly for a sole assembly and a method of manufacture, and, in particular, to a mold assembly for producing a midsole formed of two materials.

BACKGROUND OF THE INVENTION

Conventional articles of athletic footwear include two primary elements, an upper and a sole structure. The upper provides a covering for the foot that comfortably receives and securely positions the foot with respect to the sole structure. In addition, the upper may have a configuration that protects the foot and provides ventilation, thereby cooling the foot and removing perspiration. The sole structure is secured to a lower portion of the upper and is generally positioned between the foot and the ground. In addition to attenuating ground reaction forces, the sole structure may provide friction, control foot motions (e.g., by resisting over pronation), and impart stability, for example. Accordingly, the upper and the sole structure operate cooperatively to provide a comfortable structure that is suited for a wide variety of activities, such as walking and running.

The sole structure generally incorporates multiple layers that are conventionally referred to as an insole, a midsole, and an outsole. The insole is a thin, compressible member located within the upper and adjacent to a plantar (i.e., lower) surface of the foot to enhance footwear comfort. The midsole, which is conventionally secured to the upper along the length of the upper, forms a middle layer of the sole structure and is primarily responsible for attenuating ground reaction forces. The outsole forms the ground-contacting element of footwear and is usually fashioned from a durable, wear-resistant material that includes texturing to improve traction.

The conventional midsole is primarily formed from a resilient, polymer foam material, such as polyurethane or ethylvinylacetate, that extends throughout the length of the footwear, often by way of an injection molding process. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators.

It would be desirable to provide a mold assembly for a dual density midsole and a method of manufacturing a dual density midsole that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide a method for producing a midsole for an article of footwear having first and second portions that may have different densities. In accordance with a first aspect, a method of forming a midsole includes the steps of placing a first mold member and a second mold member of a first mold assembly in contact with one another; injecting a first material into a first recess and a second recess in the first mold member to form first and second portions of a midsole preform while the first mold member is maintained at a temperature below an ambient temperature; positioning the first and second portions in a first midsole recess in a third mold member of a second mold assembly; placing a second material in the first midsole recess; placing the third mold member and a fourth mold member of the second mold assembly in contact with one another; subjecting the second material and the first and second portions in the second mold assembly to heat to form a midsole preform; placing the midsole preform in a second midsole recess in a fifth mold member of a third mold assembly; placing the fifth mold member and a sixth mold member of the third mold assembly in contact with one another; and subjecting the midsole preform in the third mold assembly to heat and pressure to form a midsole.

In accordance with another aspect, a method of forming a sole assembly includes the steps of placing a first mold member and a second mold member of a first mold assembly in contact with one another; injecting a first material into a first recess and a second recess in the first mold member to form a first portion and a second portion of a midsole preform while the first mold member is maintained at a temperature below an ambient temperature; positioning the first portion and the second portion in a first midsole recess in a third mold member of a second mold assembly; placing a second material having a hardness different than a hardness of the first material in the first midsole recess; placing the third mold member and a fourth mold member of the second mold assembly in contact with one another; subjecting the second material and the first and second portions in the second mold assembly to heat to form a midsole preform; placing the midsole preform in a second midsole recess in a fifth mold member of a third mold assembly; placing the fifth mold member and a sixth mold member of the third mold assembly in contact with one another; subjecting the midsole preform in the third mold assembly to heat and pressure to form a midsole; removing the midsole from the third mold assembly; and securing an outsole to the midsole.

In accordance with a further aspect, a method of forming a sole assembly includes the steps of placing a first mold member and a second mold member of a first mold assembly in contact with one another; injecting a first material into a first recess and a second recess in the first mold member to form a first portion and a second portion of a midsole preform while the first mold member is maintained at a temperature below an ambient temperature; removing the first and second portions from the first recess and the second recess, respectively; positioning the first portion and the second portion in a first midsole recess in a third mold member of a second mold assembly; placing a second material in the first midsole recess in the third mold member; placing the third mold member and a fourth mold member of the second mold assembly in contact with one another; subjecting the second material and the first and second portions in the second mold assembly to heat to form a midsole preform, the midsole preform having a first groove formed about a periphery of the first portion, a second groove formed about a periphery of the second portion, and a third groove formed about a periphery of a third portion formed in the midsole preform; placing the midsole preform in a second midsole recess in a fifth mold member of a third mold assembly; placing the fifth mold member and a sixth mold member of the third mold assembly in contact with one another; subjecting the midsole preform in the third mold assembly to heat and pressure to form a midsole; removing the midsole from the third mold assembly; and securing an outsole to the midsole.

Substantial advantage is achieved by providing a method of forming a midsole formed of two different materials. In particular, certain embodiments provide the ability to provide portions of the midsole with materials of different densities and/or hardnesses, thereby providing different performance characteristics for the different portions of the midsole These and additional features and advantages disclosed here will be further understood from the following detailed disclosure of certain embodiments.

The figures referred to above are not drawn necessarily to scale, should be understood to provide a representation of particular embodiments of the invention, and are merely conceptual in nature and illustrative of the principles involved. Some features of the mold assembly for a sole assembly depicted in the drawings have been enlarged or distorted relative to others to facilitate explanation and understanding. The same reference numbers are used in the drawings for similar or identical components and features shown in various alternative embodiments. Mold assemblies for a sole assemblies and methods of manufacture for sole assemblies as disclosed herein would have configurations and components determined, in part, by the intended application and environment in which they are used.

DETAILED DESCRIPTION OF CERTAIN PREFERRED EMBODIMENTS

Figure 1:
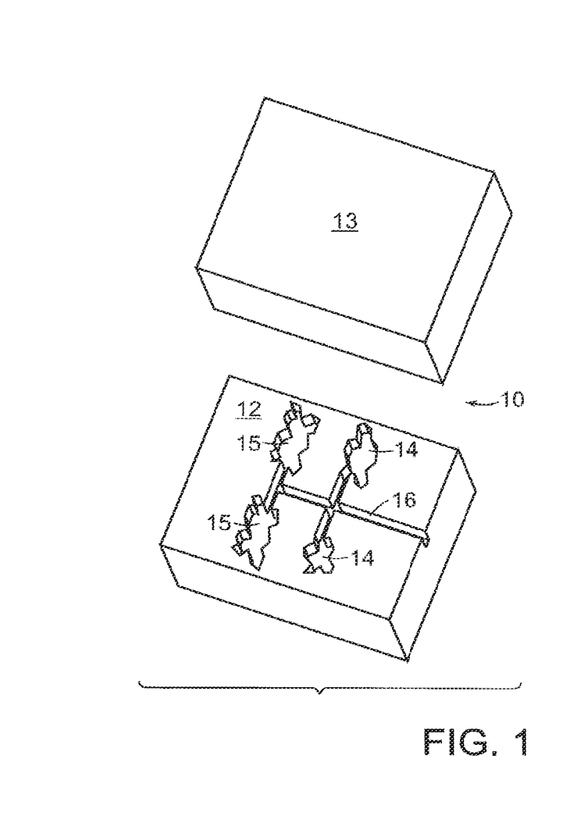
FIG. 1 is a perspective view of a first mold assembly used to form first and second portions of a midsole preform.
Figure 3:
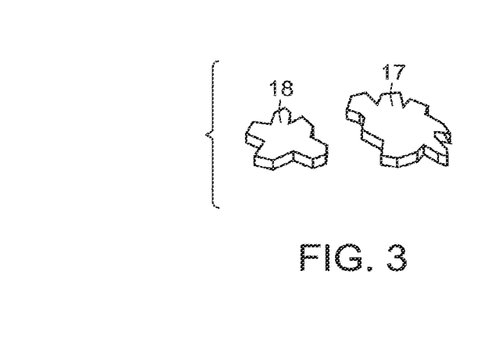
FIG. 3 is perspective view of first and second portions of a midsole preform formed using the mold assembly of FIG. 1.

An illustrative embodiment of a first mold assembly 10 for use in forming first and second portions of a midsole for an article of footwear is shown in FIG. 1. First mold assembly 10 includes a first mold member 12 and a second mold member 13. A pair of first recesses 14 and a pair of second recesses 15 are formed in a top surface of first mold member 12. A channel 16 is formed in the top surface of first mold member 12 and extends from an exterior of first mold member 12 to first and second recesses 14, 15. Channel 16 is configured such that first and second recesses 14, 15 are in fluid communication with an exterior of first mold member 12 by way of channel 16 when first mold member 12 and second mold member 13 are in contact with one another. First mold member 12 is used to form a first portion 18 and a second portion 17 of a midsole preform and subsequently a midsole, as seen in FIG. 3.

In the illustrated embodiment, there are two first recesses 14 formed in first mold member 12, one of which serves to form a first portion 18 of a left midsole of an article of footwear, and the other which serves to form a first portion 18 of a right midsole of an article of footwear. Similarly, there are two second recesses 15 formed in first mold member 12, one of which serves to form a second portion 17 of a left midsole of an article of footwear, and the other which serves to form a second portion 17 of a right midsole of an article of footwear.

It is to be appreciated that first mold member 12 may include only one first recess 14 and one second recess 15, or more than two first and second recesses 14, 15. That is, any number of first and second recesses 14, 15 may be provided in first mold member 12, thereby providing for the simultaneous formation of any number of midsole first portions 18 and second portions 17.

Figure 2:
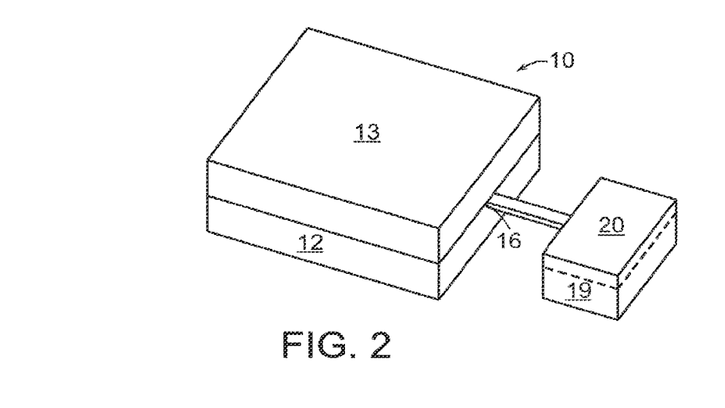
FIG. 2 is a perspective view of an injection assembly connected to the first mold assembly of FIG. 1 and used to inject a first material into the first mold assembly.

A method of forming a midsole is initiated by placing first mold member 12 and second mold member 13 in contact with one another, as seen in FIG. 2. A first material 19 is then injected into first mold assembly 10 from an injection assembly 20 by way of channel 16. In certain embodiments, first material 19 is injected at a temperature of between approximately 83° C. and approximately 86° C.

First mold assembly 10 is maintained at a temperature below ambient, in a process known as cold molding, and produces first portions 18 and second portions 17. In certain embodiments, first mold assembly 10 is maintained at a temperature between approximately 48° C. and approximately 52° C. for between approximately 40 seconds and approximately 60 seconds. In certain embodiments, first material 19 is maintained at a pressure of between approximately 80 kg and approximately 100 kg.

First mold assembly 10 is then disassembled, that is, first and second mold members 12, 13 are separated from one another, and each first portion 18 and second portion 17 (only one of each is shown in FIG. 3) is removed from first mold assembly 10.

In the illustrated embodiment, first portion 18 and second portion 17 are to be positioned in a forefoot portion of a midsole. It is to be appreciated that first portion 18 and second portion 17 can be positioned in any portion of a midsole.

Figure 4:
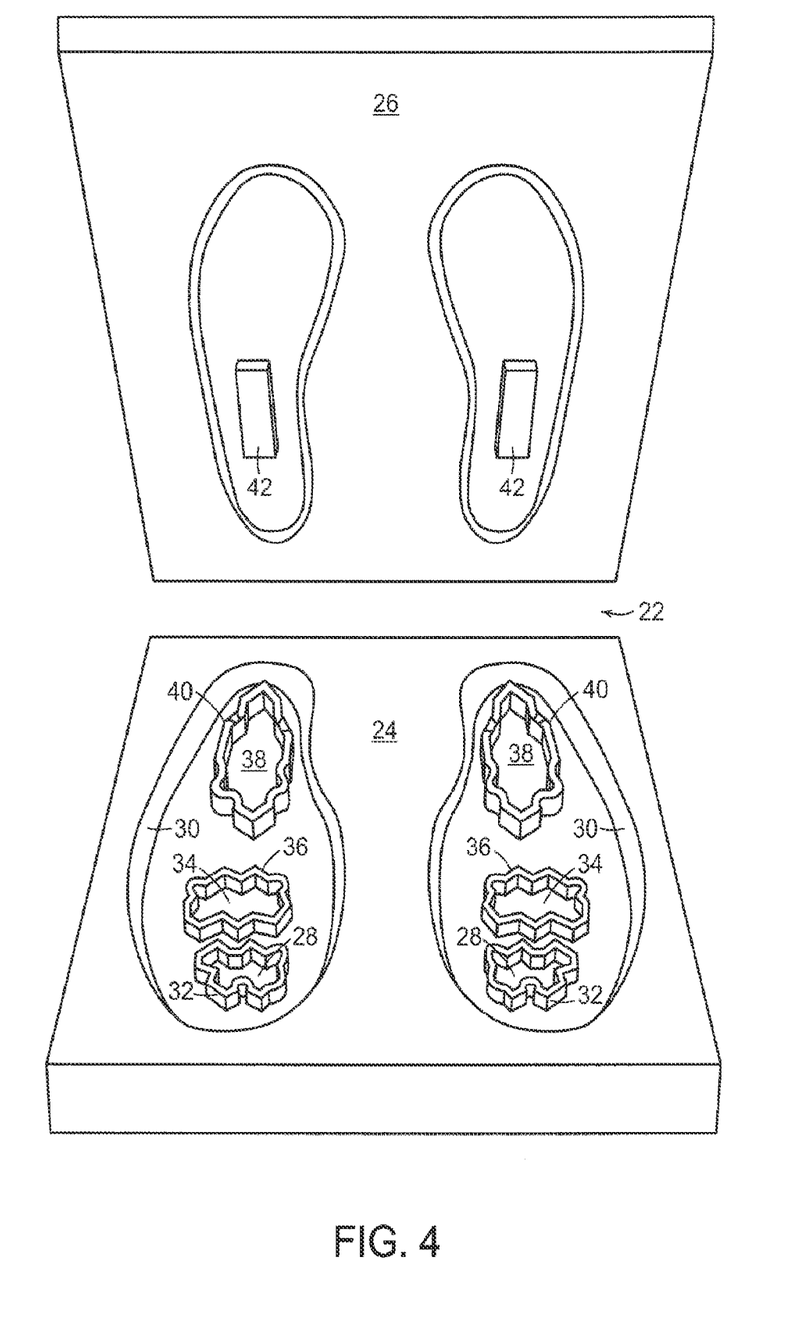
FIG. 4 is a perspective view of a second mold assembly that receives the first and second portions of FIG. 3 and is used to form a midsole preform.
Figure 5:
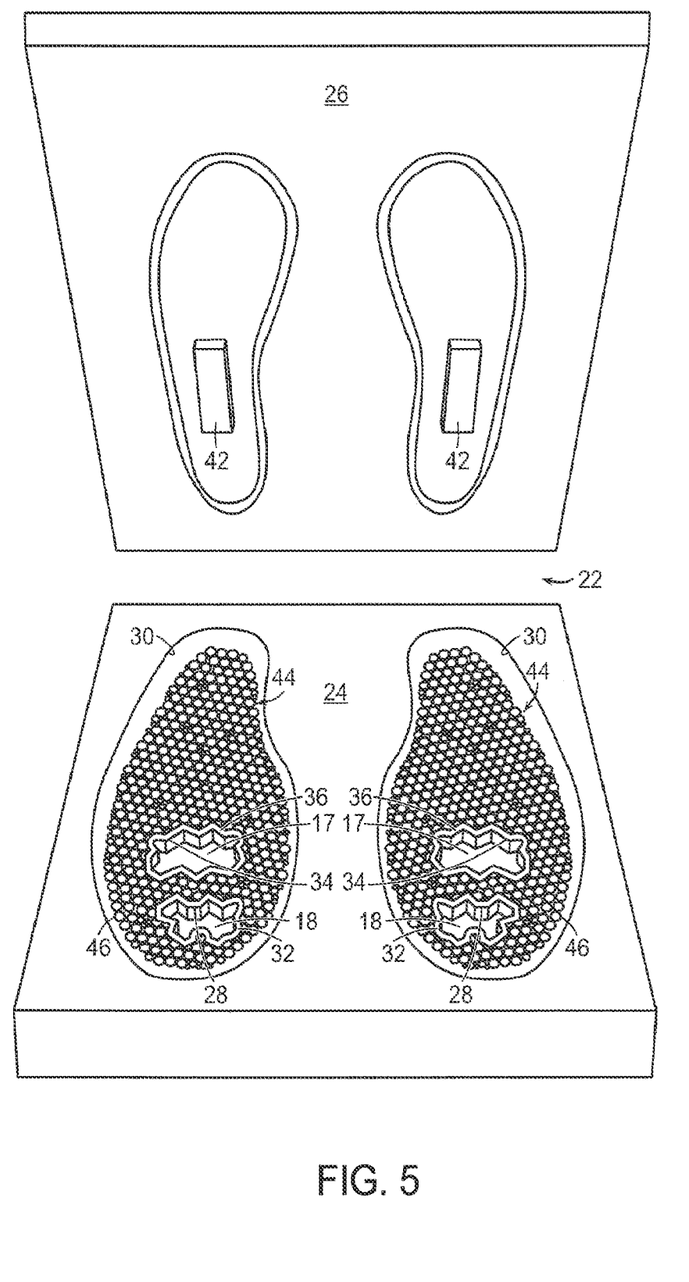
FIG. 5 is a perspective view of the second mold assembly of FIG. 4 shown with a second material positioned therein.
Figure 6:
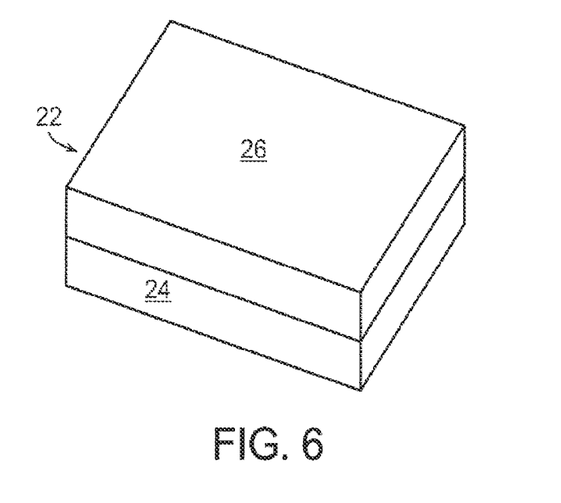
FIG. 6 is a perspective view of the second mold assembly of FIG. 4 shown in a closed condition.
Figure 7:
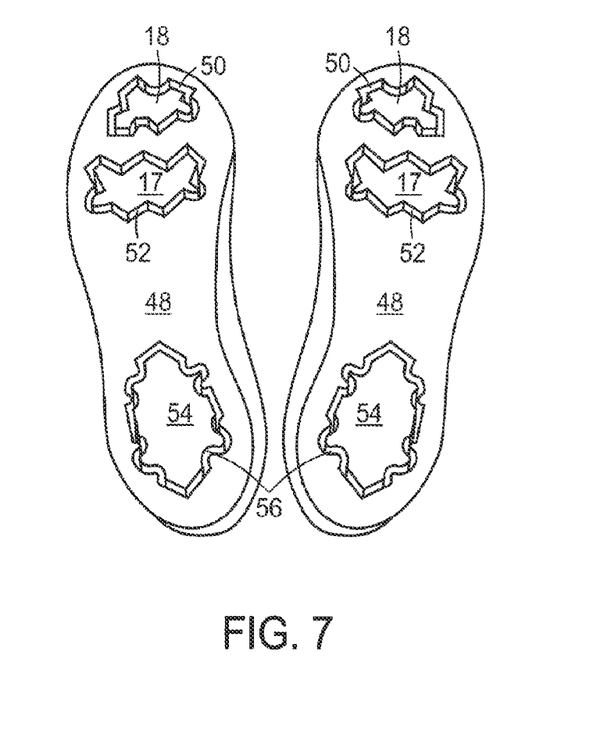
FIG. 7 is a perspective view of midsole performs formed in the second mold assembly of FIGS. 4-6.

As seen in FIGS. 4-6, a second mold assembly 22 includes a third mold member 24 and a fourth mold member 26, which will contact third mold member 24 when second mold assembly 22 is closed. A first portion recess 28 is formed in a corresponding foot-shaped first midsole recess 30 formed in third mold member 24, as seen in FIG. 4. In the illustrated example, first portion recess 28 is formed by a first wall 32 extending upwardly from a bottom surface of first midsole recess 30.

Similarly, a second portion recess 34 is formed in first midsole recess 30. In the illustrated example, second portion recess 34 is formed by a second wall 36 extending upwardly from the bottom surface of first midsole recess 30.

A third portion recess 38 may also be formed in first midsole recess 30. Third portion recess 38 is formed by a third wall 40 that extends upwardly from the bottom surface of first midsole recess 30. In the illustrated embodiment, third portion recess 38 is formed in a heel portion of first midsole recess 30.

One or more surface discontinuities 42 may be formed on the bottom surface of fourth mold member 26, which will impart a corresponding surface discontinuity 43 in a preform 48 (seen in FIG. 9) made with second mold assembly 22. It is to be appreciated that surface discontinuity 42 may be a projection or a recess, for example, and that the corresponding surface discontinuity in the perform will then be a mating recess or projection, respectively.

As seen in FIG. 5, a first portion 18 is placed in each first portion recess 28 in third mold member 24, and a second portion 17 is placed in each second portion recess 34. A second material 44 is placed in first midsole recess 30 as well as third portion recess 38. In certain embodiments, second material 44 is formed of a plurality of pellets 46. Pellets 46 may be spherical, cylindrical, or any other desired shape. In certain embodiments pellets 46 are substantially cylindrical extruded members with a diameter of between approximately 3.4 mm and approximately 4.0 mm.

After the desired number of pellets 46 of second material 44 is placed in each first midsole recess 30, third mold member 24 and fourth mold member 26 of second mold assembly 22 are then placed in contact with one another, as seen in FIG. 6. Second mold assembly 22 is then subjected to heat for a desired amount of time, thereby producing a midsole preform 48, which is seen in FIG. 6 after being removed from second mold assembly 22.

Preform 48 includes first portion 18, which is exposed to an exterior of preform 48 in a forefoot portion of the bottom surface of preform 48. A first groove 50 is formed about the periphery of first portion 18, and corresponds to the shape of first wall 32. Similarly, second portion 17 is positioned just rearwardly of first portion 18, and is exposed to the exterior of preform 48 in the bottom surface of preform 48. A second groove 52 is formed about the periphery of second portion 17, and corresponds to the shape of second wall 36.

The portion of second material 44 that is seated in third portion recess 38 forms a third portion 54 in a heel portion of preform 48. A third groove 56 is formed about the periphery of third portion 54, and corresponds to the shape of third wall 40.

In certain embodiments, second mold assembly 22 is maintained at a temperature between approximately 165° C. and approximately 169° C. for between approximately 590 seconds and approximately 610 seconds.

As perform 48 is formed in second mold assembly 22, second material 44 expands, thereby producing a preform that is larger than a desired size of a midsole to be formed through the entire midsole forming process. In certain embodiments, preform 48 is approximately 160-170% the size of the midsole to be formed.

In certain embodiments, first material 19 may have a first hardness and second material 34 may have a second hardness that is different than the first hardness. In certain embodiments, first material 19 has a first hardness between approximately 34 Asker C and approximately 36 Asker C, while second material 44 has a second hardness between approximately 39 Asker C and approximately 42 Asker C.

By providing first material 19 with a different density or hardness than second material 44, preform 48 can be modified to achieve particular performance characteristics. Particular regions of the midsole formed from preform 48 can easily be engineered and constructed to have performance characteristics that are different from other regions of the midsole.

First material 19 and second material 44 can be formed of any desired material. Suitable first and second materials include rubber, polyurethane foam, microcellular elastomeric foams, or phylon (Ethylene Vinyl Acetate ('EVA') foam). In certain embodiments, second material 44 is injection phylon. Other suitable first and second materials will become readily apparent to those skilled in the art, given the benefit of this disclosure.

Figure 8:
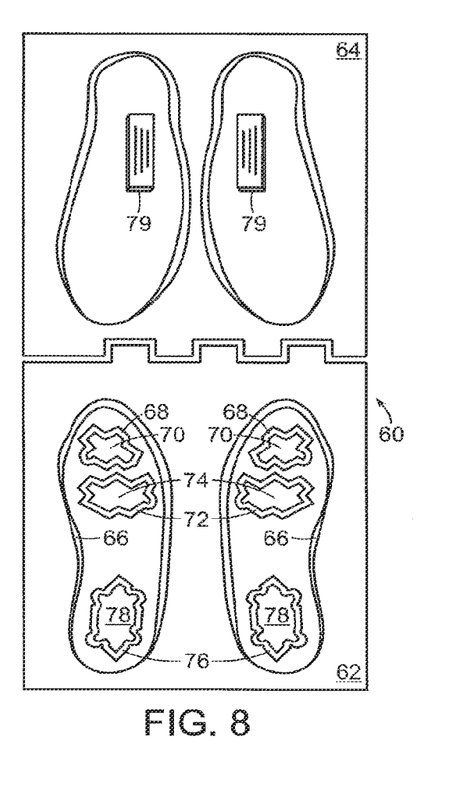
FIG. 8 is a perspective view of a third mold assembly that receives the midsole preforms of FIG. 7 and is used to further process the midsole preforms.
Figure 9:
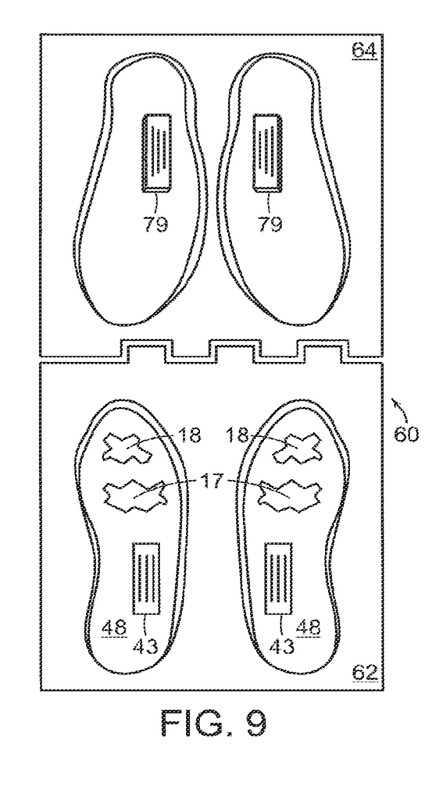
FIG. 9 is a perspective view of the third mold assembly of FIG. 8, shown with the midsole preforms positioned in the third mold assembly.

Preform 48 then undergoes a further pressing operation using a third mold assembly 60, seen in FIGS. 8-9. Third mold assembly 60 includes a fifth portion 62 and a sixth portion 64. Each midsole preform 48 is positioned bottom surface down in a corresponding second midsole recess 66 formed in fifth portion 62. It is to be appreciated that in certain embodiments, preform 48 may need to be partially compressed or squeezed into third mold assembly 60, since it is significantly larger in size than the resulting midsole to be formed third mold assembly 60.

A first projecting wall 68 extends upwardly from the bottom surface of second midsole recess 66, and defines a first portion recess 70 therein. First portion 18 of preform 48 is received in first portion recess 70 when preform 48 is positioned in second midsole recess 66. First groove 50 of preform 48 receives first projecting wall 68 when preform 48 is positioned in second midsole recess 66.

A second projecting wall 72 extends upwardly from the bottom surface of second midsole recess 66, and defines a second portion recess 74 therein. Second portion 17 of preform 48 is received in second portion recess 74 when preform 48 is positioned in second midsole recess 66. Second groove 52 of preform 48 receives second projecting wall 72 when preform 48 is positioned in second midsole recess 66.

A third projecting wall 76 extends upwardly from the bottom surface of second midsole recess 66, and defines a third portion recess 78 therein. Third portion 54 of preform 48 is received in third portion recess 78 when preform 48 is positioned in second midsole recess 66. Third groove 56 of preform 48 receives third projecting wall 76 when preform 48 is positioned in second midsole recess 66.

Figure 10:
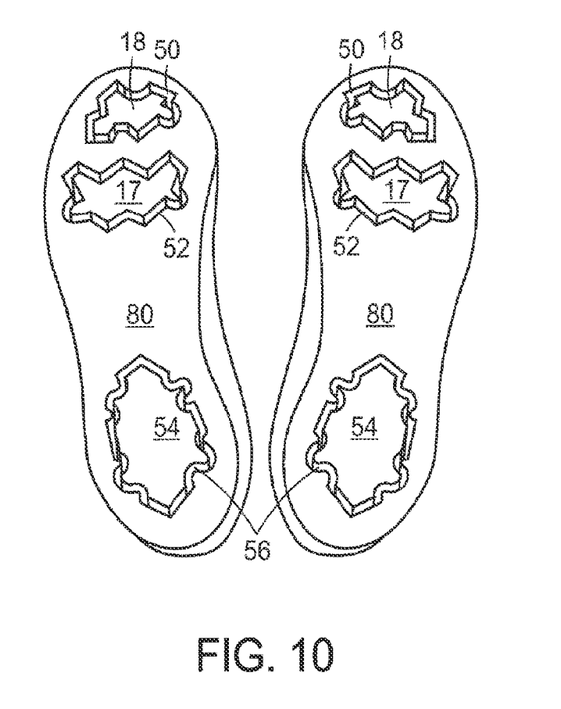
FIG. 10 is a perspective view of the midsoles formed in the third mold assembly of FIGS. 8-9.

Sixth portion 64 of third mold assembly 60 is then placed in contact with fifth portion 62 of third mold assembly 60, and midsole preform 48 is subjected to heat and pressure within third mold assembly 60 to form a midsole 80 as seen in FIG. 10.

In certain embodiments, midsole preform 48 is pressed within third mold assembly 60 for between approximately 14 and approximately 16 seconds and subjected to steam pressure of between approximately 6 kg and approximately 8 kg.

In certain embodiments, first material 19 has a hardness of between approximately 52 Asker C and approximately 56 Asker C after pressing in third mold assembly 60, and second material 44 has a hardness of between approximately 56 Asker C and approximately 62 Asker C after pressing in third mold assembly 60.

The amount of compression that individual portions of midsole 80 undergo while being formed in third mold assembly will affect the properties of those individual portions. For example, third portion 54 may be larger than other portions and, therefore, undergo a greater amount of compression, such that third portion 54 is denser or harder than other portions of midsole 80.

Consequently, the performance of midsole 80 can be optimized in many ways. For example, first, second and third portions 18, 17, and 54, along with corresponding first, second, and third grooves 50, 52, and 56 can be positioned in specific desired locations within midsole 80. Additionally, the depth of first, second, and third grooves 50, 52, and 56 can be varied to alter the performance of midsole 80. Further, the type of material chosen for first and second materials 19, 44 can be varied to provide different performance characteristics for different portions of midsole 80.

In certain embodiments, fifth portion 62 and sixth portion 64 may include surface irregularities that form mating surface irregularities in midsole 80. For example, a projection formed on one of fifth portion 62 and sixth portion 64 will form a mating recess in the surface of midsole 80. It is to be appreciated that any number of surface irregularities can be formed in third mold assembly 60, and at any location on fifth portion 62 and sixth portion 64. In the illustrated embodiment, a projection 79 on sixth portion 64 will provide a mating recess (not shown) on midsole 80. Projection 79 corresponds to surface discontinuity 42 on fourth mold member 26 of second mold assembly 22.

It is to be appreciated that each of first portion 18, second portion 17, and third portion 54 is connected to the remainder of midsole preform 48 only at the bases thereof due to the presence of the first, second, and third grooves, 50, 52, and 56, respectively, thereby providing flexibility for the movement of first portion 18, second portion 17, and third portion 54 within midsole 80.

Figure 11:
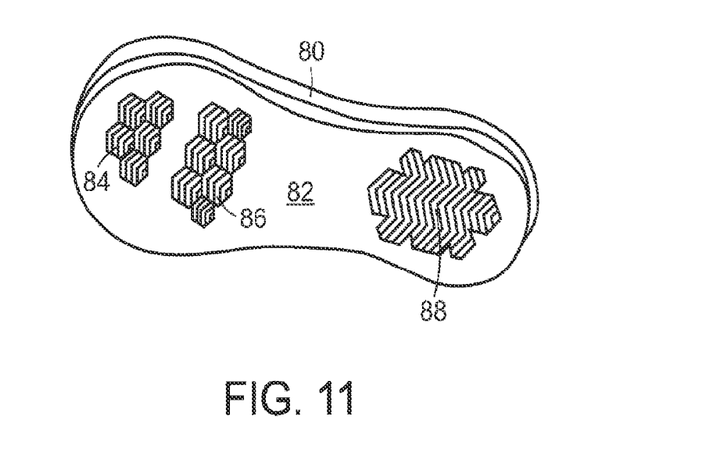
FIG. 11 is a perspective view of a midsole of FIG. 10 shown with an outsole secured thereto.

As seen in FIG. 11, an outsole 82 may be secured to a lower surface of midsole 80 with an adhesive or any other suitable fastening means. Outsole 82 may include a first tread portion 84 that is positioned beneath first portion 18 of midsole 80, a second tread portion 86 that is positioned beneath second portion 17 of midsole 80, and a third tread portion 88 that is positioned beneath third portion 54 of midsole 80.

Outsole 82 may include raised walls (not visible) that are received in first, second, and third grooves 50, 52, and 56 of midsole 80.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of forming a midsole comprising the steps of:
    injecting a first material into a first recess and a second recess of a first mold member of a first mold assembly to form first and second portions of a midsole preform;
    positioning the first and second portions in a first midsole recess in a third mold member of a second mold assembly;
    placing a second material in the first midsole recess;
    placing the third mold member and a fourth mold member of the second mold assembly in contact with one another;
    subjecting the second material and the first and second portions in the second mold assembly to heat to form a midsole preform;
    placing the midsole preform in a second midsole recess in a fifth mold member of a third mold assembly;
    placing the fifth mold member and a sixth mold member of the third mold assembly in contact with one another; and
    subjecting the midsole preform in the third mold assembly to heat and pressure to form a midsole.

2. The method of forming a midsole of claim 1, wherein the first mold member includes at least one additional first recess and at least one additional second recess, an additional first portion of a midsole preform being formed in each additional first recess, and an additional second portion of a midsole preform being formed in each additional second recess.

3. The method of forming a midsole of claim 1, wherein the first and second portions are positioned in a forefoot portion of the midsole preform, the second portion being positioned rearwardly of first portion.

4. The method of forming a midsole of claim 1, wherein the first material has a first hardness and the second material has a second hardness that is different than the first hardness.

5. The method of forming a midsole of claim 1, wherein the second material is placed in the first midsole recess in the form of pellets.

6. The method of forming a midsole of claim 1, wherein the first mold member of the first mold assembly includes a channel, the channel extending between the first and second recesses and an exterior of the first mold member.

7. The method of forming a midsole of claim 6, wherein the first material is injected into the first recess through the channel.

8. The method of forming a midsole of claim 1, wherein the first material is EVA.

9. The method of forming a midsole of claim 1, wherein the second material is EVA.

10. The method of forming a midsole of claim 1, wherein the midsole preform is approximately 160-170% of a size of the midsole.

11. The method of forming a midsole of claim 1, wherein a first groove is formed about a periphery of the first portion of the midsole preform and a second groove is formed about a periphery of the second portion of the midsole preform.

12. The method of forming a midsole of claim 11, wherein the first groove is formed by a first wall extending upwardly from a bottom of the first midsole recess of the second mold assembly, and the second groove is formed by a second wall extending upwardly from a bottom of the first midsole recess of the second mold assembly.

13. The method of forming a midsole of claim 1, wherein a third portion is formed in a heel portion of the midsole preform, a third groove being formed about a periphery of the third portion.

14. The method of forming a midsole of claim 13, wherein the third groove is formed by a third wall extending upwardly from a bottom of the first midsole recess of the second mold assembly.

* * * * *